(12) United States Patent
Lindaman

(10) Patent No.: US 6,205,935 B1
(45) Date of Patent: Mar. 27, 2001

(54) BOLT-MOUNTED SHELF FOR USE WITH HUNTERS' TREE STANDS

(76) Inventor: Glenn Lindaman, 2650 Lehigh St., Whitehall, PA (US) 18052

( * ) Notice: Subject to any disclaimer, the term of this patent is extended or adjusted under 35 U.S.C. 154(b) by 0 days.

(21) Appl. No.: 09/384,695

(22) Filed: Aug. 27, 1999

(51) Int. Cl.[7] ............................................. A47B 5/00

(52) U.S. Cl. .......................... 108/152; 182/187; 182/129

(58) Field of Search .............................. 180/152, 42, 25, 180/26, 47; 182/187, 129, 133

(56) References Cited

U.S. PATENT DOCUMENTS

| | | | |
|---|---|---|---|
| 3,714,907 | * 2/1973 | Michieli | 108/152 |
| 4,100,999 | 7/1978 | Conner . | |
| 4,109,761 | 8/1978 | Matlock . | |
| 4,274,508 | 6/1981 | Hughes et al. . | |
| 4,415,061 | 11/1983 | Meyer . | |
| 4,582,165 | 4/1986 | Latini . | |
| 4,600,081 | 7/1986 | Wade . | |
| 4,776,503 | 10/1988 | Sink . | |
| 4,924,972 | * 5/1990 | Westbrock | 108/152 X |
| 5,131,496 | * 7/1992 | White | 108/152 X |
| 5,156,096 | 10/1992 | Lamprey . | |
| 5,165,500 | 11/1992 | Bass . | |
| 5,186,276 | 2/1993 | Craig . | |
| 5,279,388 | 1/1994 | Laughlin et al. . | |
| 5,295,556 | 3/1994 | Mullin . | |
| 5,400,183 | 3/1995 | Rosser . | |
| 5,427,344 | 6/1995 | Beauchemin . | |
| 5,469,934 | * 11/1995 | Pherigo | 108/152 X |
| 5,513,575 | * 5/1996 | Slade | 108/42 |
| 5,562,180 | * 10/1996 | Herzog et al. | 108/152 X |
| 5,595,428 | * 1/1997 | Huang | 108/25 X |
| 5,743,353 | 4/1998 | Browning et al. . | |
| 5,918,550 | * 7/1999 | Weir et al. | 108/152 X |

FOREIGN PATENT DOCUMENTS

2235775 * 1/1974 (DE) ..................................... 108/152

* cited by examiner

*Primary Examiner*—Jose V. Chen
(74) *Attorney, Agent, or Firm*—Duane Morris & Heckscher LLP

(57) ABSTRACT

A shelf is mountable on a crank-shaped support that threads into the trunk of a tree, preferably in association with a hunter's tree stand. The crank-shaped support forms a threaded lag bolt at one end, perpendicular to an intermediate crank arm. At the opposite end of the crank arm from the lag bolt, an elongated mounting portion protrudes outwardly relative to the tree. When the lag bolt is threaded into the tree trunk, the crank arm depends vertically. The shelf part has a receptacle such as a square tube along the underside of a planar shelf part that receives the mounting portion of the crank-shaped support. Complementary non-round cross sections of the mounting portion and the tube hold the planar member horizontal to support items in convenient reach of the hunter. The planar shelf part can have an upwardly protruding rim around its perimeter or at least partly bounding the available surface and confining the items. The lag bolt is threaded into the tree in a cranking motion, preferably to a depth where friction resists further rotation. The weight of an item aligned to the crank arm does not tilt the shelf because the force is along the crank arm. If the item is laterally off center, rotation of the mounted shelf and consequent tilting of the shelf are minimized because the shelf is spaced well below the rotation axis, namely the axis of the lag bolt. Rotation is also resisted frictionally. Affixation to the tree is quick and easy due to the leverage provided by the intermediate length of the crank when rotating the lag bolt. No tools are required. The crank member can be dimensioned to fit within the contour of the planar shelf part for easy transport. A round handle receptacle can be placed upon the mounting portion and grasped when turning the crank. The support minimizes dropping of items by the hunter and thus avoids the need to descend to retrieve dropped items.

14 Claims, 3 Drawing Sheets

BOLT-MOUNTED SHELF FOR USE WITH HUNTERS' TREE STANDS

BACKGROUND OF THE INVENTION

1. Field of the Invention

The invention concerns a shelf-like platform or receptacle that is attachable by means of a crank shaped bolt that is threaded directly into the trunk of a tree. The crank shaped bolt support preferably is an integral piece with a tapering threaded lag bolt, a crank arm and a non-round shelf-mounting part. The shelf-mounting part engages in a complementary opening in the shelf or similar supporting platform, thus holding the shelf or platform in a desired orientation, normally horizontal.

2. Prior Art

A wide variety of tree stands for hunters are known, all generally comprising some sort of platform that can be placed at a height above the ground, and on which a hunter can stand or sit while waiting for passing game. Game animals such as deer are alert to threats at ground level. The instincts of such prey animals may cause them to expend all their attention at ground level, where they might expect to encounter natural predators such as wolves or puma. The animals may neglect to look for threats at a higher elevation, and can fail to notice a hunter in plain view because the hunter is on a tree stand at an elevation above the ground. Hunters also prefer a high vantage point, above brush that might obscure his or her view of deer or other approaching game.

Various forms of tree stands are used, but all address similar needs. The tree stand should be securely attachable to a tree, but preferably is only temporary at a given location. For safety, a tree stand should be secure and stable when mounted, especially because firearms may be used and could inadvertently discharge if jarred or dropped. A larger platform is generally more safe and comfortable than a smaller one.

The object of the tree stand is to provide an elevated support, normally well above the height of the hunter. The stand may include mechanical fixtures for lifting and climbing, and may have depending flanges or toothed or spurred structures that bear against and/or dig into the trunk of the tree, either at the elevation selected for hunting or at a point from which the hunter pushes off when climbing with the stand. Trunk encircling belts, chains, curving abutment bars and other trunk parts may be included and may be disposed at different elevations relative to the supporting platform.

To suit the foregoing needs, it might arguably be advantageous for a tree stand to have a large platform area, to be made of strong materials, to be outfitted with various accoutrements and mechanical assists for climbing and affixation to the tree at a selected elevation, and to have appointments for comfort such as seat padding, a backrest, other chair structure or similar means for the hunter's comfort and convenience. In practice, however, the durability, size and complexity of the tree stand are kept to a minimum. Aspects that contribute strength, convenience, additional function or comfort, also contribute size and weight. The tree stand normally is carried to the hunting area by the hunter, often a substantial distance and frequently through woods that may be difficult to traverse with heavy or bulky equipment. The stand must be readily lifted and/or maneuvered into place by manual action of the hunter. As noted above, the stand is preferably deployed well above the ground. As a result, the typical tree stand has a simple flat platform on which the hunter stands or sits. The stand has the minimum structure possible and is made as light and compact as possible. Tree stands also sometimes rely on the hunter's weight to hold the stand at a fixed elevation, the weight being applied by appropriately leveraged structures to cause a portion of the tree stand to bite into the tree.

Getting the tree stand into place at an elevated location, and also getting onto the tree stand together with all the equipment that will be necessary or desirable for hunting (or for simply waiting) may be a difficult proposition for the hunter. Depending on the type of tree stand, the hunter may be more or less challenged when attempting to affix the tree stand at the desired elevation, or when attempting to mount a tree stand that has been affixed by other means, or when attempting to remain on the tree stand platform when waiting for passing game.

Tree stands are known which form tree climbing aids that the hunter uses to climb to a desired hunting elevation. Such a stand, for example, can have a relatively lower horizontal platform on which the hunter is to stand or sit while hunting, and a frictional bar that engages the opposite side of the trunk from the platform, at a higher position than the platform. The edge of the platform facing the tree trunk can be sharp or toothed so as to bite slightly into the tree bark. So long as the hunter's weight rests on the platform and the abutment engages the trunk on the opposite side from the platform and at the higher position, there is a resultant force on the platform to bear laterally inwardly and bite into the trunk. This fixes the elevation of the tree stand on the trunk.

This type of stand is most apt from tree trunks without low branches. Means are provided for the hunter to manipulate the stand while supporting his weight on the tree, apart from the stand. For this purpose the platform can be affixed to the hunter's feet via straps or similar receptacles. The hunter grasps or hugs the tree trunk to support his weight, as if to shinny up the trunk. The hunter flexes his legs and tilts the tree stand forward, disengaging the platform and the opposite higher abutment from the trunk, and lifting the stand incrementally upward. The hunter straightens his legs and the stand, and allows his weight to bear back against the platform. The opposite side abutment stops frictionally against the tree and the platform bites into the trunk on the near side, fixing the stand to the tree at the new higher elevation. The hunter continues climbing in this manner, or to descend the hunter reverses the process, proceeding in an inchworm fashion to ascend or descend the tree trunk.

Obviously, the hunter would prefer to climb the tree only once in this manner, and to come down only when ready to leave. The inching technique is time consuming, laborious and possibly noisy. If something is dropped after climbing to the desired elevation, the hunter cannot leave the stand in place, descend to recover the item and climb back up to the stand. The stand is needed for inchwise climbing or descending the tree in the absence of branches. The hunter's weight also may be needed to keep the stand engaged in fixed elevation rather than to slide down the trunk.

Tree stands also are known that are used by first climbing the tree without assistance, and carrying along the tree stand, for example in the form of a back pack as in U.S. Pat. No. 4,582,165—Latini; U.S. Pat. No. 4,776,503—Sink; and U.S. Pat. No. 5,186,276—Craig. Instead of carrying the stand, the hunter can tie a rope to the tree stand when on the ground, carry an end of the rope when climbing to the desired elevation, and then pull the stand up. This involves either climbing the tree with the encumbrance of the stand, or threading the stand through any branches that may foul it when drawing the stand up into position. One can only carry so much at a time when climbing. After climbing the tree and attaching the stand, the hunter may need to climb down again to retrieve further equipment to be carried up before the hunter can occupy the stand for hunting. This involves a lot of climbing up and down. The climbing can be a chore, because the optimal hunting location is rather high, for example twenty feet (6 meters) or so above the ground.

It is also known to mount a tree stand relatively permanently to a tree and to use it several times or for more than one hunting season. Inasmuch as the installation is for several uses, it is cost effective to provide a large and/or elaborate stand, and to go to some effort to mount it securely to the tree trunk. For example the stand may be customized to the diameter of the particular tree. It may be provided with accoutrements such as seats, railings, sheltering overhangs and the like, substantially resembling a tree house. The stand can be affixed on a custom base configured for a crotch or branch in the trunk, and/or bolted or nailed directly to the tree trunk and left there permanently. A permanently mounted stand has benefits such as size and optionally convenient fixtures, but is inconvenient to build and cannot readily be moved from one location to another. The hunter might visit long before hunting to bring building materials to the site, tools, a ladder and other construction equipment. Several trips may be needed.

In a permanent installation the hunter can also install climbing aids, such as protruding steps or rungs comprising cross members attached by nails or bolts that are driven or threaded into the tree trunk. In an even more permanent arrangement, staggered steps can be attached on opposite sides of the trunk to protrude radially, similar to the steps on utility poles used by telephone and power company linemen. Examples of such steps are disclosed, for example, in U.S. Pat. No. 4,415,061—Meyer; U.S. Pat. No. 5,279,388—Laughlin et al.; and U.S. Pat. No. 5,743,353—Browning et al.

All these relatively permanent installations and their options and conveniences can involve a considerable investment of work and money. The resulting structure, which is unattended in the woods, may not be exclusive to its builder and may attract other hunters whose presence tends to discourage game. What is needed is a way to adapt the temporary, lightweight and compact form of tree stand so that the hunter need not ascend and descend repeatedly. The major reason to descend prematurely (i.e., before bagging game) is to recover an article that has been left behind or dropped on the ground.

Depending on the type of tree stand used, it may be more or less inconvenient to descend and ascend repeatedly, but it is always undesirable. It is very frustrating to inadvertently drop some needed piece of equipment when on the tree stand and also likely to adversely affect the chances for hunting. The hunter must descend, possibly root around in the brush to recover the item, ascend again carrying the item and re-situate himself, if possible without dropping the article again. Descending and ascending causes noise and motion and disperses the hunter's scent, including at ground level, which can scare off game that the hunter might never even see.

A hunter may have cause to carry many loose articles that might be dropped, such as his weapon (e.g., bow or firearm), ammunition, food or drink containers, a coat, hat and/or gloves that the hunter may wish to take off due to warming temperatures as the day progresses, etc. In moving around on the tree stand (especially of the small platform type), it is very easy to inadvertently push an article from the platform to fall on the ground. Insofar as this problem has been addressed in the prior art, it is done by providing fixtures that are part of the tree stand or are attached to the tree stand, such as hooks, each of which is intended to hold a particular type of article. The hunter can use such a hook to engage a shoulder strap of a firearm, the bowstring of a bow, the strap of a quiver or other device having a strap. An example of a holder for a bow is disclosed in U.S. Pat. No. 5,186,276—Craig. Other items may also be affixable to a given hook or special purpose receptacle, depending on the size and nature of the item and the hook, such as binoculars via a neck strap, a coat via a collar loop and so forth. Hooks and holders are generally configured with a particular purpose in mind and may not be suitable to hold items that were not designed to be suspended from a hook, or from a hook of the particular size used, or from a holder that was configured to hold some other type of item. This type of holder is not broadly applicable.

U.S. Pat. No. 4,274,508—Hughes et al. discloses a relatively complex staked-down A-frame ladder that carries an elevated web seat between opposite rungs. Creel-like "supply bags" are permanently affixed to the webbing along each side. Such bags are generally useful to hold items, this is only true for items that are smaller than the bags and only while room in the bags remains. The bags are not general purpose storage devices.

A general purpose storage device for supplementing a tree stand could be provided in the form of a shelf, which term accurately characterizes the main platform of most tree stands. A tree stand platform that resembles a simple shelf is shown in U.S. Pat. No. 4,600,081—Wade. A shelf for a cylindrical pole or tree, that resembles a tree stand in that a platform is cantilevered from a girth strap and has spaced downwardly extending bracket supports, is shown in U.S. Pat. No. 5,156,096—Lamprey. Supports of this type are almost invariably supported by two laterally spaced brackets, each having a part that extends downwardly along the tree or other vertical surface to support the cantilevered platform against sagging downwardly.

A tree stand arrangement for one hunter can comprise more than one platform forming element. In U.S. Pat. No. 5,165,500—Bass there are two platform elements that are independently mounted on the tree trunk. A lower platform provides a foot rest. An upper platform provides a chair in which the hunter sits, in this case facing the tree trunk. Having plural platform elements obviously complicates all problems associated with transporting the tree stand to its intended location; mounting the stand to the tree trunk; transporting associated equipment up to the stand, such as a firearm or a bow, ammunition, food and water, rain gear, etc.; stowing such items in sufficient proximity to reach them from the stand; and occupying the tree stand reasonably comfortably to wait for game, without dropping anything. Should the hunter drop any needed equipment after going through such preparatory steps, he must detach himself from the stand, climb down to retrieve the dropped item(s) and repeat at least some of these steps over again.

A horizontal surface is normally required to hold items temporarily for use, and can be provided in proximity to a place where a person sits or stands, for placing such items within the person's reach. U.S. Pat. No. 5,427,344—Beauchemin teaches a means to provide one or more horizontal supporting platforms for use with a tree stand. According to Beauchemin, all the elements associated with the tree stand, including the main platform for the hunter, are suspended by cords from a girth belt that is cinched onto the tree trunk using a belt length adjustment and a bale clasp. Spaced hooks engage over the belt and support flat platform elements that are suspended below the hooks by loops of cord depending from spaced hooks of the pair. Hooks are used in a similar manner to suspend one platform below another, namely with the hooks for the lower platform being attached to the cord of the upper one.

The Beauchemin shelves address the need for a storage area near the hunter in the tree stand, but the choices for such area are limited to unoccupied positions under the girth belt or under another similar shelf. Insofar as the platforms are suspended by flexible cords they are easily displaced if bumped and can swing like pendulums, dropping items resting on the shelf. These supports are wholly inapt for temporary placement of parts that can roll.

The Beauchemin platform that supports the hunter is likewise suspended from spaced hooks. The point of attachment at the hooks is closer to the tree trunk than the center of gravity of the shelf. Thus the hunter's platform is cantilevered outward from the trunk, as are all of the shelves that are suspended directly from the girth belt or from another point closer to the tree trunk than the center of gravity of that shelf. Each cord is a U-shaped length, the ends of which are knotted at the hook. If the platform is to be horizontal as needed to support a load, the cantilevering is such that a relatively shorter vertical length of the U-shape extends from the hook to an edge of the platform adjacent to the trunk, and a relatively longer diagonal length extends from the hook to the edge of the platform that is spaced from the trunk. These two lengths of cord are continuous with a length of cord that runs under the platform from the near edge to the far edge. The result of this cantilevered arrangement is that a weight on the platform urges the platform to sag, i.e., to become inclined downwardly and outwardly. Beauchemin attempts to address this problem by running the cord through a number of spaced slots along the edges of the platform or shelf to keep the platform horizontal when loaded, but the slots are not fully effective. An excess length of cord can be left at the bottom of the U-shape (for adjusting the vertical spacing between the hooks and their platform or for suspending shelves from one another in ranks). It is necessary to adjust the cord to place the platform at the correct spot along the cord to hold the platform horizontal as it is installed. Attention and setup are necessary, and even after setting up the arrangement, variations in loading, movement of the hunter and other occurrences may cause the arrangement to creak audibly, the platforms can become tilted relative to horizontal, and swinging of the suspended shelves can drop the supported items, whereupon the hunter must descend, retrieve the items, ascend and re-stow the gear and himself.

It would be advantageous if a compact platform arrangement could be provided for the convenience of a hunter using a tree stand, in which the platform can be installed easily, without numerous hooks or other fasteners, and preferably via a single easily-installed fastener. Although supported at as little as a thin lateral position across its width, the platform should remain stable and horizontal over a range of loading conditions, for example when the weight on the support is not centered. Preferably the platform can be placed anywhere that storage is most conveniently required. According to an aspect of the present invention, such a platform is provided by means of a shelf that is non-rotatably attached to a lag bolt having spaced right angles between a threaded end and a protruding end that are parallel, spaced and oppositely oriented portions of an integral metal part. Step members that are threaded or driven into tree trunks, telephone poles and the like are known, for example for use by electric power and telephone linemen to scale wooden utility poles. Typically such step members are straight lengths that are driven or threaded into the wooden pole and protrude perpendicular to the pole axis by a distance at least equal to the width of a climber's foot. Examples of steps that have an associated right angle, however, are also known. An example of such a step carried on a girth belt is shown in U.S. Pat. No. 4,109,761—Matlock. Examples in which a right angle member is mounted to a tree or pole via a conventional lag bolt are disclosed in U.S. Pat. No. 4,415,061—Meyer; U.S. Pat. No. 5,279,388—Laughlin et al.; and U.S. Pat. No. 5,743,353—Browning et al. These devices are useful as steps but are not structured or embodied for supporting a shelf, particularly because the foot supporting portion is rotatable relative to the lag bolt. This arrangement is not useful to support a shelf, because rotation would allow the shelf to rotate and dump any load that was not balanced along the axis of the lag bolt.

SUMMARY OF THE INVENTION

It is an object of the invention to optimize and embody the idea of a convenience shelf for use by a hunter who occupies a tree stand disposed on a tree or wooden pole.

It is also an object to make the convenience shelf and all its parts as compact and easily transported as possible.

It is another object that the shelf is to be non-rotatably and non-displaceably mountable at any available point on and around the tree or pole, in particular between waist and shoulder height of a hunter who stands or sits on a tree stand.

It is a further object that the shelf is arranged to retain items placed upon it, even if such items are heavy or eccentrically placed, and the shelf is not mounted at a precisely horizontal orientation.

According to a further object the shelf is attached by a threaded member that functions as its own tool to provide mechanical leverage for threading such member into the tree or pole.

These and other objects are met according to the invention by a shelf that is mountable on a crank-shaped support that threads into the trunk of a tree, in association with a hunter's tree stand. The crank-shaped support forms a threaded lag bolt at one end, perpendicular to an intermediate crank arm. At the opposite end of the crank arm from the lag bolt, an elongated mounting portion protrudes outwardly relative to the tree. When the lag bolt is threaded into the tree trunk, the crank arm depends vertically. The shelf part has a receptacle such as a square tube along the underside of a planar shelf part that receives the mounting portion of the crank-shaped support. Complementary non-round cross sections of the mounting portion and the tube hold the planar member horizontal to support items in convenient reach of the hunter. The planar shelf part can have an upwardly protruding rim around its perimeter or at least partly bounding the available surface and confining the items. The lag bolt is threaded into the tree in a cranking motion, preferably to a depth where friction resists further rotation. The weight of an item aligned to the crank arm does not tilt the shelf because the force is along the crank arm. If the item is laterally off center, rotation of the mounted shelf and consequent tilting of the shelf are minimized because the shelf is spaced well below the rotation axis, namely the axis of the lag bolt. Rotation is also resisted frictionally. Affixation to the tree is quick and easy due to the leverage provided by the intermediate length of the crank when rotating the lag bolt. No tools are required.

The crank member can be dimensioned to fit within the contour of the planar shelf part for easy transport. A round handle receptacle can be placed upon the mounting portion and grasped when turning the crank. The support minimizes dropping of items by the hunter and thus avoids the need to descend to retrieve dropped items.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings

DETAILED DESCRIPTION OF THE PREFERRED EMBODIMENTS

Figure 1:
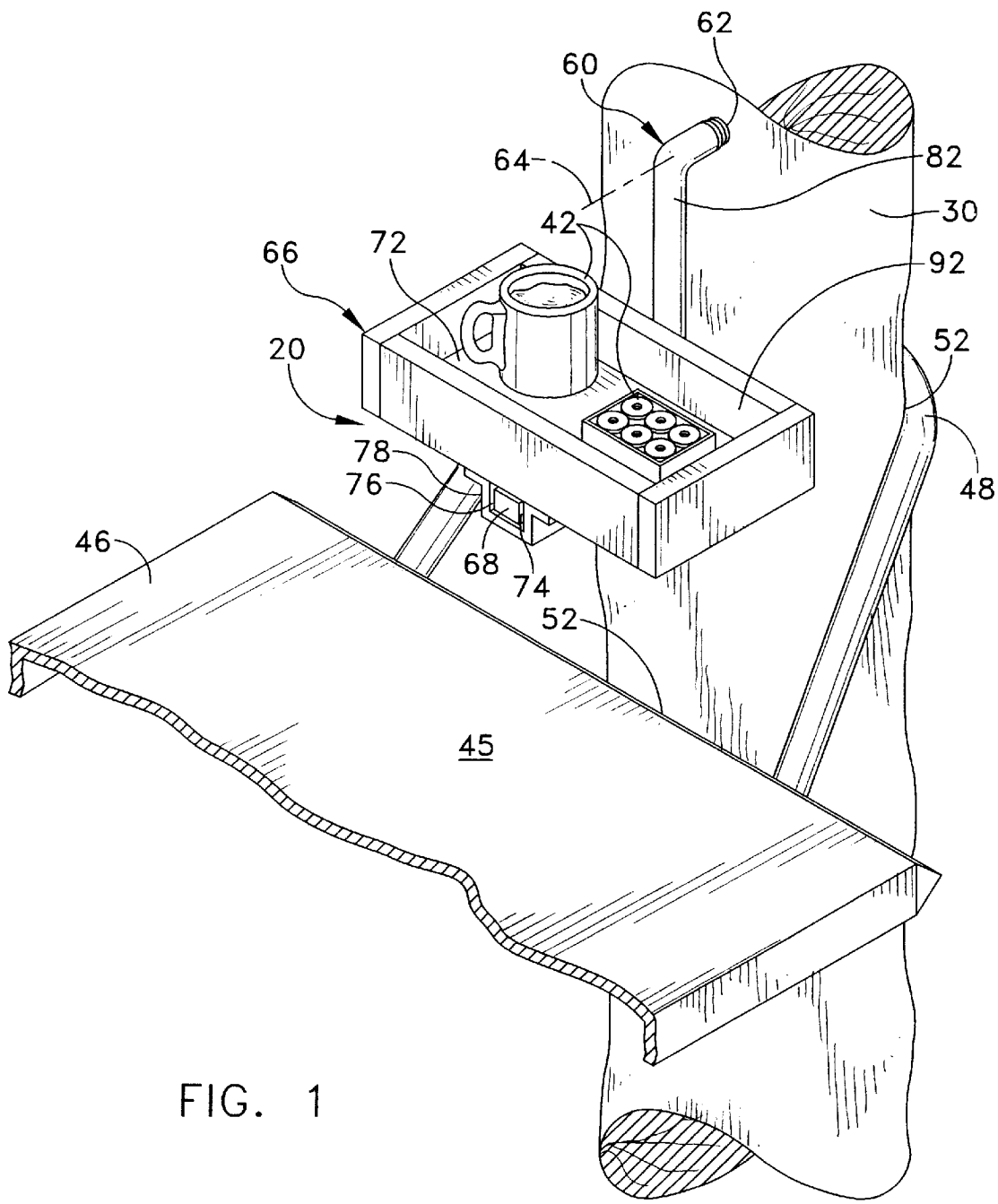
FIG. 1 is a perspective view illustrating the hunter's convenience shelf according to the invention, as used with a tree stand.

FIG. 1 illustrates the convenience shelf structure 20 according to a preferred embodiment of the invention, attached to a tree trunk 30 as its supporting body and holding general types of items 42 in proximity with a tree stand 45 or the like, i.e., within reach of a hunter (not shown) on the tree stand.

An exemplary tree stand 45 is partly shown in FIG. 1, for example of a type having a lower weight-supporting platform 46 affixed to an upper trunk-engaging structure 48 that extends around the opposite side of the tree trunk 30. Other types of tree stands and/or supporting elements of a mechanical device or perhaps the tree itself can also be used. For example, the hunter or a platform defining element may be supported wholly or partly on a tree limb, and the shelf 20 of the invention can be disposed within reach of the hunter when located there.

The platform 46 and/or the engaging structure 48 in the example shown have sharp edges 52 that bite slightly into the trunk 30 and thereby maintain the elevation of the stand 45. The engaging structure 48 is at least frictionally affixed to the tree trunk 30 at a point higher on the trunk than the platform 46, and on the opposite side of the trunk 30. Therefore, a weight on the cantilevered platform 46 (in particular the weight of the hunter) produces a resultant force urging the platform 46 laterally or radially inwardly toward the tree trunk 30. The facing edge of platform 46, preferably likewise is provided with a pointed edge, toothed configuration or similar frictional or biting-type contour for affixing the platform at a selected elevation on the trunk and assisting in maintaining the elevation of the tree stand 45.

One aspect of this type of tree stand, as well as other types, is that the platform 46 and the trunk-engaging structure 48 can be located or relocated anywhere along the tree trunk 30 that the hunter desires, subject to clearance requirements for tree limbs or other obstructions (not shown). The stand 45 can be higher or lower, or disposed at any angular point around the tree. The stand 45 can be looped over branches for whole or partial support, or placed on a clear length of trunk as shown. Therefore, it may be necessary or desirable in a given installation of the tree stand for the hunter to mount the convenience receptacle or shelf 20 at various different positions where it will be within reach of the hunter. The hunter might also choose one mounting position for the shelf over another depending on what sort of article 42 is to be supported. The shelf 20 of the invention can be installed at any point on trunk 30 where there is a spot sufficiently clear of branches. The shelf 20 is quickly and easily installed because it has only a single fastener 60, yet provides a stable horizontal support that cannot readily tip and thereby drop items off. The shelf 20 supports any of a wide variety of items, including items that tend to roll. The shelf 20 minimizes the danger that the hunter may drop articles when on the tree stand 45 and thus reduces or eliminates situations in which the hunter must descend, recover a dropped item and ascend back to the desired hunting elevation, which for example may be about twenty feet (three meters) above the ground.

Figure 2:
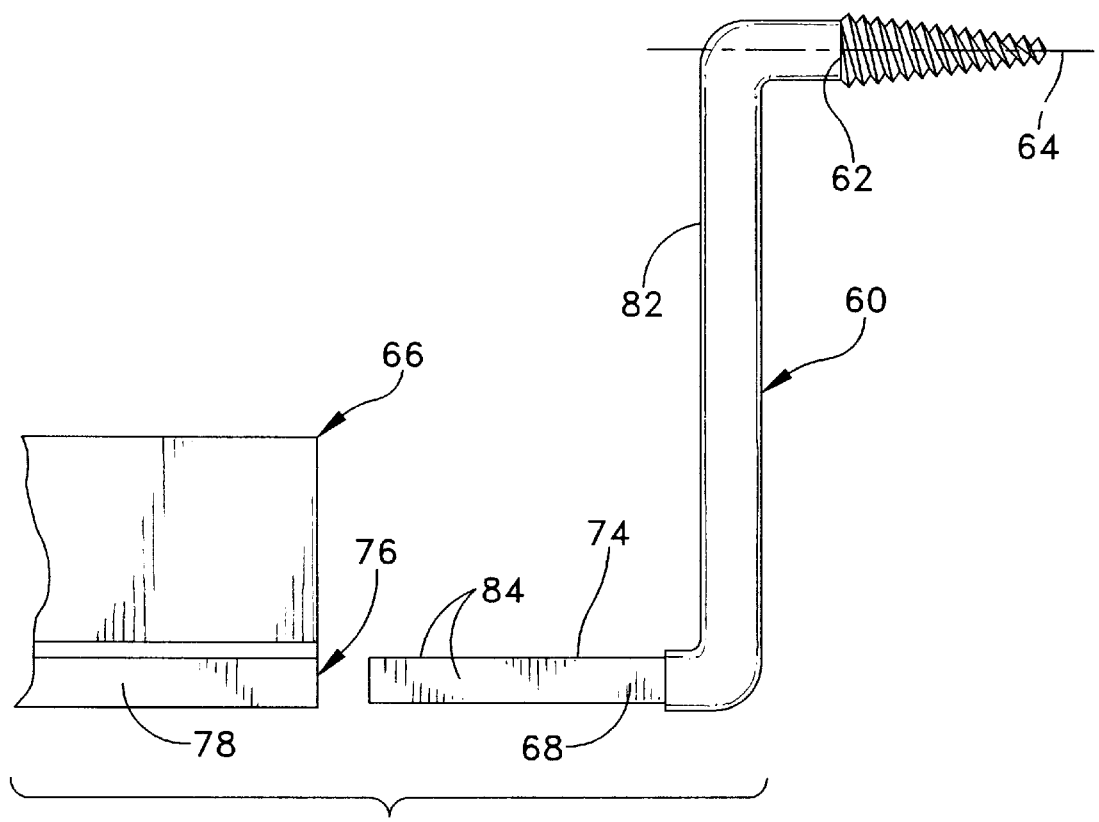
FIG. 2 is an exploded side elevation showing the shelf parts apart from the tree and the tree stand.
Figure 3:
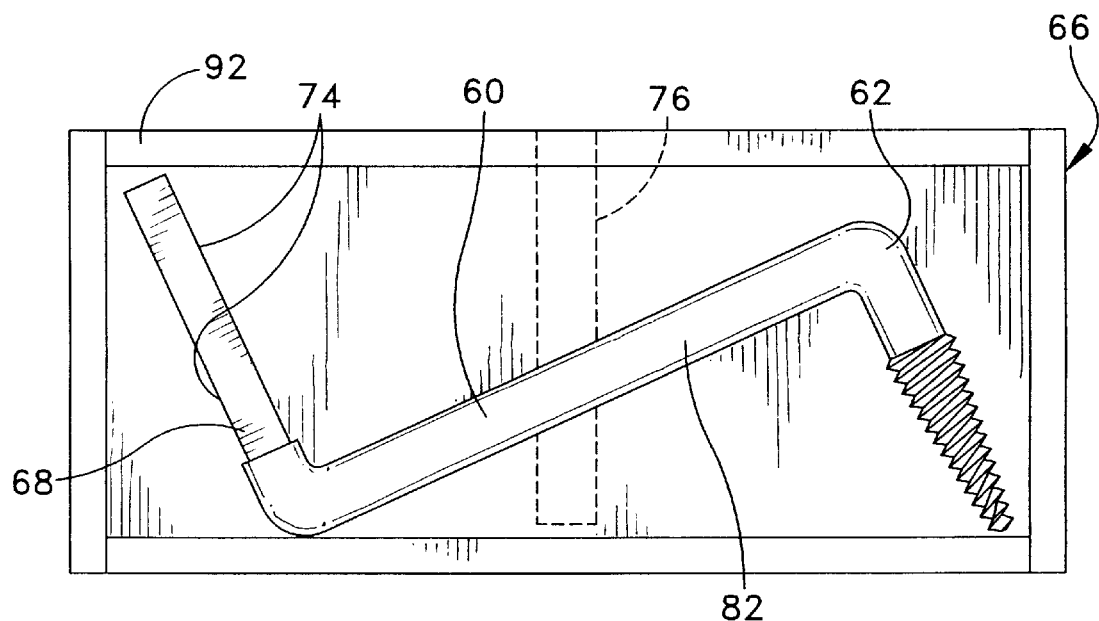
FIG. 3 is a top plan view thereof, with the shelf portion carrying the crank-like mounting part.

The convenience support 20 is carried on a single support in the form of a bolt member 60 having a mounting portion with a thread 62 dimensioned for threading the bolt member 60 at least part way into tree trunk 30 by rotation of the bolt member 60 around an elongated axis 64 of the thread 62. As shown in FIGS. 2 and 3, the thread 62 is preferably a tapered substantially to a point and/or comprises a coarse helical thread protruding radially from a conical point and cylindrical shank, namely of the type normally for use with wood screws and bolts such as lag bolts. The thread 62 of bolt member 60 threads directly into the wood material, in this case tree trunk 30. The bolt member 60 can also be mounted to wooden bodies other than tree trunks, in the same manner. The substantially horizontal supporting element 66 of shelf structure 20 is carried on a part 68 of the bolt member 60 that protrudes at the end opposite from the thread end.

The shelf defining supporting element 66 has a substantially planar supporting surface 72 that extends in at least one direction perpendicular to the thread axis 64, i.e., laterally to one or both sides of the thread axis 64, in a direction defining a shelf width. The supporting surface 72 of shelf element 66 also extends in a direction parallel to thread axis 64, defining a shelf depth, namely a depth extending outwardly from the tree trunk 30 parallel to a radius defined by the thread axis 64. The shelf structure 20 can also be mounted with the thread axis 64 aligned to an orientation other than radial to the tree trunk 30, provided sufficient clearance for the shelf element 66 is provided. The supporting shelf element 66 can support items 42 over an area encompassing this shelf width and shelf depth, provided that the supporting shelf 66 is oriented substantially horizontally.

The supporting shelf 66, and more particularly the planar supporting surface 72 thereof, is maintained in a substantially horizontal orientation by interaction of certain structural aspects of the bolt member 60 and the supporting shelf element 66. One of the supporting shelf 66 and the bolt member 60 has a nonround external contour, and the other of shelf 66 and bolt member 60 has a nonround receptacle that is complementary to the nonround external contour of the first one. In the embodiment shown in FIG. 1, the bolt member 60 comprises a protruding male part 68 having a non-round external contour. The supporting shelf element 66 has a complementary receptacle 76 along its underside, and defines the female part. In the embodiment shown, the complementary receptacle 76 is defined by the inner surfaces of a channel or square tube 78 placed under supporting shelf element 66.

The channel or receptacle 76 and the protruding part 68 of bolt member 60 are coupleable by engaging the nonround receptacle 76 with the complementary external contour of part 68, namely by aligning the channel on the underside of supporting shelf element 66 to the protruding part 68 of bolt member 60 and sliding the shelf member 66 onto the bolt member 60. The complementary non-round contours of the protruding or free end 68 of bolt member 60 and channel receptacle 76 engage such that the supporting shelf element 66 is prevented from rotating relative to the bolt member 60.

Bolt member 60 is also prevented from any substantial rotation relative to tree trunk 30. According to one aspect, the thread of the bolt member defines a surface in contact with the wood of the tree trunk. Thus friction between the thread and the body in which it is threaded resists rotation of the thread in the tree trunk. The length is sufficient to resist rotation for the expected loads, and moreover, as discussed below, the crank-shaped configuration of the bolt member 60 also inherently resists rotation when oriented vertically. For general frictional support (regardless of orientation) to support a shelf of about 12 to 18 inches (about 35 cm) in lateral width, and for the expected loads, the thread preferably has a length of about 4 inches (10 cm). The bolt member 60 preferably has a diameter at its widest of about 0.5 inches (1.3 cm).

The crank shape of bolt member 60 is another aspect that reduces or eliminates the tendency of the bolt member 60 to rotate relative to tree trunk 30 due to loading. The weight of a load on the shelf element 66 is disposed at the non-round protruding part 68 of bolt member 60, and that part 68 is spaced from the thread axis 64 by a length of the bolt member defining a crank arm 82. Thus the bolt member 60 comprises a mounting portion 62 that defines a first length, elongated along and substantially coextensive with the thread; an intermediate length 82 attached at the outer end of the elongated mounting portion, the intermediate length 82 extending substantially perpendicularly from the mounting portion 62 and the thread axis 64; and a coupling portion 68 for engaging the shelf 66 and comprising one of said nonround receptacle 76 and said external contour 74 (the external contour in FIG. 1).

The mounting portion 62, intermediate length 82 and the coupling portion 68 reside in a common plane and in the embodiment shown are joined precisely at right angles, with the mounting portion and coupling portion being parallel and extending in opposite directions. The coupling portion 68 is elongated along an axis perpendicular to that of the intermediate length 82 and parallel to the threaded mounting portion 62, but spaced from the mounting portion by the length of the intermediate part. In short, the bolt member 60 defines connected "┌" and "┘" shapes forming a manual crank for rotation around the thread axis 64. The threaded mounting portion 62 defines a rotation axis, the intermediate part 82 defines a radial crank arm and the coupling portion 68 defines an axially parallel protruding handle that can be used to rotate and thread the bolt member 60 into the tree trunk 30 using the bolt member as a crank having a mechanical advantage due to leverage from the intermediate part or crank arm.

It will be appreciated that the mutually perpendicular thread, crank and handle segments 62, 82, 68, respectively, need not be precisely perpendicular or arranged precisely in a common plane in order to function as described. Provided the crank part places the handle part at a radial distance from the rotation axis 64 of the threaded mounting portion 62, the bolt member 60 can function as a manual crank. As another alternative, the bolt member 60 could be a linear (straight) element, with the shelf element 66 providing the structure that protrudes from the thread axis 64.

Figure 4:
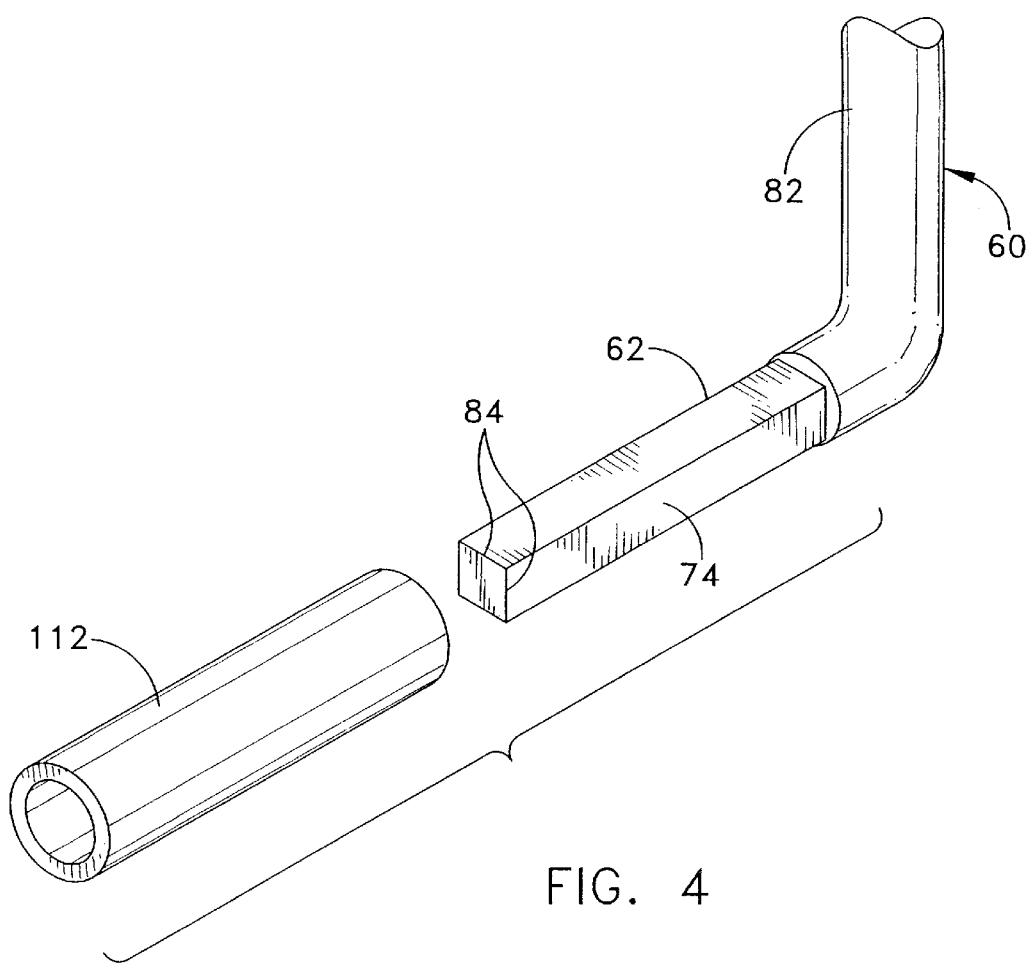
FIG. 4 is a partial side elevation showing the attachment of a handle with a round internal diameter to the non-round portion of the crank.

The non-round coupling portion 68 in the embodiment of FIG. 1 comprises an elongated rod having a rectilinear cross section, which is also shown in FIGS. 2, 3 and 4. The rectilinear cross section can be made by removing material (e.g., grinding) to leave flat mutually perpendicular faces 84 on the coupling portion 68 as shown in FIGS. 2 through 4, or a rectilinear or similar cross section can be form by flattening the malleable metal of the coupling portion (e.g., steel) by compression or impact to similarly form faces 84 that render the structure non-round and thus capable of rotational fixing relative to the receptacle opening 76 of shelf element 66. Referring to FIGS. 1 and 2, the supporting shelf element 66 has an elongated non-round opening 76 that is complementary to the male part 68 and parallel to the planar surface 72 of shelf 66. This opening can be formed by attaching a channel or box tube 88 along the underside of the shelf member 66 as shown. In the embodiment shown, the supporting shelf further comprises a standing rim 92 extending vertically upwardly and forming a confining boundary around at least part of the planar supporting surface 72. Preferably the rim 92 extends fully around the perimeter of planar surface 72. Alternatively, aligned non-round openings can be formed in two opposite portions of rim 92 or side walls of the shelf member 66 above the horizontal supporting surface 72 such the non-round coupling member occupies some of the space over the supporting surface 72 rather than under it. The supporting surface 72 likewise can have a groove (not shown) with a square cross section for receiving the coupling portion 68 of bolt member 60. Other variations will now also be apparent.

The planar support surface 72 of the shelf is spaced by the intermediate portion or crank arm 82 from rotation axis 64 of the thread. When threading the bolt member 60 into the tree trunk 30, at the last rotation the hunter preferably leaves the bolt member 60 oriented such that the coupling member 68 is vertically under the rotation or thread axis 64. Due to this positioning, the weight borne by the shelf is well below the thread axis and does not tend to rotate the bolt member 60 around the thread axis 64. The center of gravity of the load may be laterally centered to maximize the stability of the arrangement. However, even if the load is placed to the left or right on the shelf such that the center of gravity is not directly under the rotation axis 64, the elongated downward spacing of the load from the rotation axis by virtue of the crank arm 82 is such that the center of gravity of the load still resides substantially below the rotation axis. This arrangement reduces the moment arm and leverage applied to rotate around the thread axis, by an off center load, as compared to a comparable arrangement in which no intermediate length is provided and the shelf resides at or near the height of the thread rotation axis. This aspect tends to keep the shelf stable and to avoid spilling articles on the shelf over the rim.

Figure 5A:
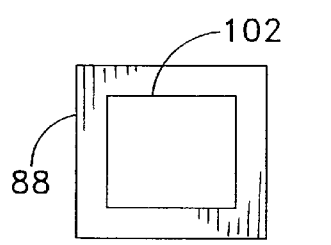
FIGS. 5a–5c are partial side elevations showing some exemplary non round cross sectional shapes.
Figure 5B:
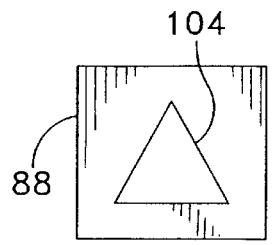
Figure 5C:
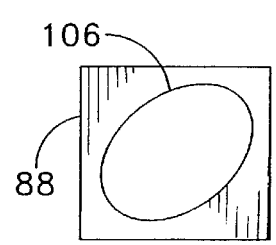

As shown in FIG. 1, the shelf 20 can support various items 42 within arms reach of a hunter on platform 46, including relatively heavy loads that are not precisely centered, such as a beverage cup or a box of ammunition as shown. The frictional engagement of the threaded mounting part 62 of the bolt member 60 tends to keep the shelf member at the position where it is left, and preferably this position is such that the intermediate portion forming the crank arm extends vertically downward. However, the friction may be sufficient to support many loads if the crank arm 82 is placed at orientations other than vertical. For example, referring to FIG. 5a, if the non-round contour by which the bolt member and the shelf engage has a square cross section 102, then the shelf will remain stable and horizontal with the crank arm at any of four positions, namely 0, 90, 180, 270 degrees. The triangular shape 104 in FIG. 5b has three positions spaced at 120 degrees. Other polygonal non-round shapes can be used as well. The oval shape 106 of FIG. 5c has only diametrically opposite positions, which would also be the case for a non-square rectangle. Although these shapes permit the bolt member 60 to be set at different orientations, the vertical orientation (FIG. 2) is the preferred orientation. The other orientations can be used in the case of minimal loads or in situations in which a vertical orientation is not possible due to obstructions and/or the threaded part is frictionally engaged very tightly, etc.

The shelf and mounting arrangement of the invention is compact in that the dimensions of the unit are substantially the length and width of the planar supporting part and the depth of the perimeter rim that keeps rolling items from rolling off the support. As shown in FIG. 3, the unit is even more compact if the bolt member is dimensioned to fit within the rim.

The non-round protruding part 68 of the bolt member 60 functions as a handle in the foregoing embodiments. It is possible to render the non-round contour round and to employ it as a handle, for example, by providing a bushing 112 having an internal diameter equal to the largest cross sectional length as shown in FIG. 4, namely an internal diameter substantially equal to a diagonal of the protruding part 68 in the embodiment shown. The bushing in FIG. 4 rotatably engages the protruding non-round part of the bolt member, and can be grasped as a handle when rotating the crank arm to thread the threaded portion into the tree trunk.

Additional variations and embodiments based on the foregoing examples are also possible. The invention is not limited to the precise embodiments discussed above as examples, and is intended to encompass a certain range of variations and equivalents in accordance with the disclosure as a whole, and with the appended claims, defining the scope of the invention in which exclusive rights are claimed.

What is claimed is:

1. A convenience shelf structure to be attached to a supporting body for carrying an item, the shelf structure comprising:
    a bolt member having a thread dimensioned for threading the bolt member at least part way into the supporting body by rotation of the bolt member around an elongated thread axis;
    a supporting shelf having a substantially planar surface extending in at least one direction perpendicular to the thread axis, defining a shelf width, and extending in a direction parallel to the thread axis, defining a shelf depth, whereby the supporting shelf can support said item over an area encompassing the shelf width and the shelf depth when the supporting shelf is oriented substantially horizontally;
    wherein one of the supporting shelf and the bolt member has a nonround external contour, and the other of the supporting shelf and the bolt member has a nonround receptacle that is complementary to said nonround external contour, and wherein the supporting shelf and the bolt member are coupleable by engaging the nonround receptacle with the external contour; and,
    wherein the bolt member comprises a mounting portion comprising a first length elongated along and substantially coextensive with the thread, a intermediate length attached at one end thereof to the elongated mounting portion, the intermediate length extending perpendicularly from the mounting portion, and a coupling portion comprising one of said nonround receptacle and said external contour.

2. The shelf structure of claim 1, wherein the thread is sufficiently long to resist rotation by friction when threaded into the body.

3. The shelf structure of claim 1, wherein the mounting portion, the intermediate length and the coupling portion reside in a common plane.

4. A convenience shelf structure to be attached to a supporting body for carrying an item, the shelf structure comprising:
    a bolt member having a thread dimensioned for threading the bolt member at least part way into the supporting body by rotation of the bolt member around an elongated thread axis;
    a supporting shelf having a substantially planar surface extending in at least one direction perpendicular to the thread axis, defining a shelf width, and extending in a direction parallel to the thread axis, defining a shelf depth, whereby the supporting shelf can support said item over an area encompassing the shelf width and the shelf depth when the supporting shelf is oriented substantially horizontally;
    wherein one of the supporting shelf and the bolt member has a nonround external contour, and the other of the supporting shelf and the bolt member has a nonround receptacle that is complementary to said nonround external contour, and wherein the supporting shelf and the bolt member are coupleable by engaging the nonround receptacle with the external contour;
    wherein the mounting portion, the intermediate length and the coupling portion reside in a common plane; and,
    wherein the coupling portion is elongated along an axis perpendicular to the intermediate length and parallel to the mounting portion.

5. A convenience shelf structure to be attached to a supporting body for carrying an item, the shelf structure comprising:
    a bolt member having a thread dimensioned for threading the bolt member at least part way into the supporting body by rotation of the bolt member around an elongated thread axis;
    a supporting shelf having a substantially planar surface extending in at least one direction perpendicular to the thread axis, defining a shelf width, and extending in a direction parallel to the thread axis, defining a shelf depth, whereby the supporting shelf can support said item over an area encompassing the shelf width and the shelf depth when the supporting shelf is oriented substantially horizontally;
    wherein one of the supporting shelf and the bolt member has a nonround external contour, and the other of the supporting shelf and the bolt member has a nonround receptacle that is complementary to said nonround external contour, and wherein the supporting shelf and the bolt member are coupleable by engaging the nonround receptacle with the external contour;
    wherein the mounting portion, the intermediate length and the coupling portion reside in a common plane; and,
    wherein the coupling portion and the mounting portion are elongated on parallel axes and extend in opposite directions at opposite ends of the mounting portion.

6. The shelf structure of claim 3, wherein the coupling portion comprises an elongated rod having a rectilinear cross section and the supporting shelf has an elongated opening complementary to the rod and parallel to the planar surface.

7. The shelf structure of claim 6, wherein the supporting shelf comprises a channel having a rectilinear cross section extending along an underside of the supporting shelf.

8. The shelf structure of claim 3, wherein the supporting shelf further comprises a rim extending vertically upwardly and at least partly bounding a portion of the planar surface.

9. The shelf structure of claim 8, wherein the rim protrudes upwardly around a perimeter of the planar surface.

10. In combination, a hunter's tree stand and a supporting shelf for carrying items accessible to an occupant of the tree stand, comprising:

said tree stand having a structure attachable to a trunk of a tree at an elevation above ground elevation and a structure on which a hunter can be supported above said ground elevation;

a shelf structure attachable to the tree trunk within reach of said structure on which the hunter can be supported, the shelf structure comprising a bolt member having a thread dimensioned for threading the bolt member at least part way into the trunk by rotation of the bolt member around an elongated thread axis, a supporting shelf having a substantially planar surface extending in mutually perpendicular directions perpendicular to the thread axis, thereby defining a shelf width and shelf depth sufficient to support an item, and a nonround receptacle extending parallel to the planar surface, said bolt member comprising a mounting portion defining a first length elongated along and substantially coextensive with the thread, a intermediate length attached at one end thereof to the elongated mounting portion, the intermediate length extending perpendicularly from the mounting portion, and a coupling portion comprising one of said nonround receptacle and said external contour;

whereby the mounting portion can be threaded into the trunk using the intermediate length as a radial crank arm and the coupling portion as a handle, whereupon the supporting shelf is received on the coupling portion and held at an orientation that is fixed relative to the intermediate length.

11. The combination of claim 10, wherein the coupling portion has a substantially square cross section, the thread on the mounting portion tapers to define a lag bolt, and wherein the coupling portion, intermediate length and mounting portion are integral parts of a single metal piece.

12. A shelf structure for supporting items on a horizontal surface within reach of an occupant supported in a tree independently of said shelf, the shelf structure comprising:

a bolt member having a threaded portion for threading the bolt member into the tree along a thread axis, a coupling portion with a non-round contour elongated in a direction parallel to the thread axis and extending in a direction opposite from the thread axis, and an intermediate portion between the bolt member and the threaded portion;

a supporting shelf having a substantially planar surface extending in mutually perpendicular directions in a plane parallel to the thread axis, thereby defining a shelf width and shelf depth to support an item, and a non-round receptacle elongated in a direction parallel to the planar surface, the nonround receptacle being complementary with the non-round contour of the coupling portion of the bolt member so as to fix the shelf nonrotatably on the bolt member and hold the planar surface horizontal when the bolt member is threaded into the tree.

13. The shelf structure of claim 12, wherein the intermediate portion is perpendicular to the thread axis and the perpendicular to the coupling portion, the intermediate portion spacing the coupling portion from the thread axis and permitting operation of the bolt member as a crank when threading the bolt member into the tree.

14. The shelf structure of claim 12, further comprising a peripheral rim extending vertically upwardly and bounding a periphery of the planar surface at least on a side opposite from the tree.

* * * * *